July 5, 1927.
B. JASSEN
1,634,290
WIND DEFLECTOR FOR AUTOMOBILES
Filed July 14, 1921
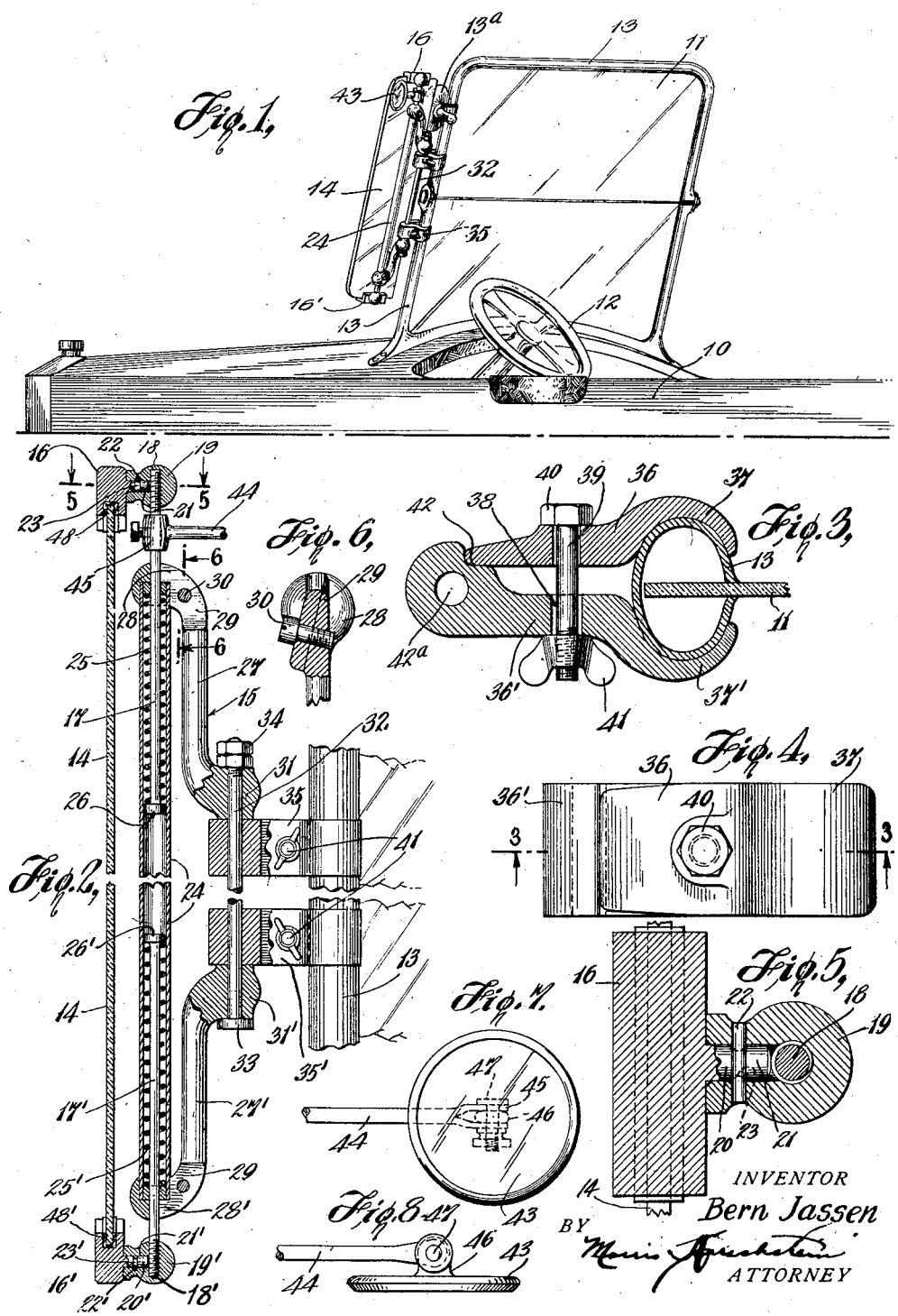
INVENTOR
Bern Jassen
BY
ATTORNEY Patented July 5, 1927.

1,634,290

UNITED STATES PATENT OFFICE.

BERN JASSEN, OF NEW YORK, N. Y.

WIND DEFLECTOR FOR AUTOMOBILES.

Application filed July 14, 1921. Serial No. 484,831.

This invention relates to wind deflectors for automobiles and the like vehicles.

One object thereof is to provide a device of the character described which may be readily applied and adjusted to various shapes of the glass deflector member.

Another object thereof is to provide a device of the character described with means for absorbing any shocks to which it may be subjected during the operation of the vehicle, thus preventing the breakage of the glass deflector.

A further object is to provide a device of the character described with means whereby the clamping members for the glass deflector may be securely snapped into position on the glass and firmly held in any particularly adjusted position of the clamps as required by the shape of the glass.

A still further object is to provide a device of the character described which shall have the advantages aforementioned and yet be simple and neat in construction so as to not impair the appearance of the vehicle to which it is applied and also be efficient in operation to a high degree.

Other objects of this invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawings, in which is shown one of various possible illustrative embodiments of this invention, Fig. 1 is a perspective view showing an embodiment of this invention in place on an automobile;

Fig. 2 is a longitudinal cross-sectional view of the embodiment shown in Fig. 1 and showing in detail the construction of the holding device for the glass;

Fig. 3 is a detailed cross-sectional view of the means for attaching the deflector to the vehicle cut along line 3—3 of Fig. 4;

Fig. 4 is a partial plan view of the means for attaching the deflector to the vehicle;

Fig. 5 is a detailed cross-sectional view of the clamping member taken along line 5—5 of Fig. 2;

Fig. 6 is a detailed cross-sectional view cut along line 6—6 of Fig. 2 showing the means for attaching the supporting frame whereby the deflector is connected to the vehicle;

Fig. 7 is a partial plan view showing the mirror and the manner of its connection to the deflector device; and Fig. 8 is a partial front elevational view as viewed from the position shown in Fig. 1 and corresponding to Fig. 5.

Referring in detail to the drawing, 10 indicates the front portion of an automobile and 11 the wind shield in front of the steering wheel 12 and comprising the window pane held within the usual metal frame 13. The embodiment of the invention shown in the drawing is illustrated in Fig. 1 as swiveled to a side of this frame.

The deflector embodying this invention comprises a pane of glass 14 of any desired shape which is connected with the frame 13 by a frame 15, the pane of glass 14 being held rigidly between the clamping members 16, 16' extending from this frame 15 as hereinafter more fully described.

The clamping device for holding the plate 14 comprises a pair of rods 17, 17' threaded on their fixed ends as at 18, 18' for ball heads 19, 19' within which the clamps 16, 16' are held. The latter are each formed with pin projections 20, 20' adapted to fit into sockets 21 21' formed in each of the ball heads 19, 19'. A pin 22, 22' passes through an opening of the ball heads 19, 19' respectively and a circular groove 23, 23' is formed in each of the pins 20, 20' respectively, of such size as to ride over the pins 22, 22' respectively which are fixed in the ball heads. In this way, by taking hold of a clamping member such as 16, it may be caused to revolve within its ball head 19, the groove 23 riding over the pin 22.

The rods 17, 17' extend into a tubular member 24 and may be moved out of the latter against the tension of springs 25, 25' housed in said tubular member with their tension acting against a collar 26, 26' respectively on rods 17, 17'.

The attaching frame 15 whereby the deflector is secured to the vehicle comprises a pair of arms 27, 27' each secured in a suitable manner respectively to each of the ends of the tubular member 24. Thus in the embodiment shown in the drawing, the bulb ends 28, 28' of the attaching frame are partially split as at 29 to be clamped about the tubular member 24 by means of a screw 30, as will be readily understood. The other ends 31, 31' of the arms 27, 27' are adapted to receive a bolt 32 held in place by means of the head 33 and nut 34 in the usual way. To this bolt are secured a pair of clamping members 35, 35' each comprising a pair of fingers 36, 36' curved as at 37, 37' to conform to the contour of the frame 13 so as to securely embrace the same. The two fingers are perforated as at 38 for the bolt 39 having the usual head 40 and a wing nut 41 whereby the two halves are tightened in place about the frame 13. One of the fingers such as 36 rests on the other finger 36' in a cut-away portion 42 formed in the latter, as will appear from Fig. 3.

It will be seen that by the manner of attachment of the deflector to the vehicle, through the medium of the arms 27, 27' and the bolt 32 and clamping members 35, 35', sufficient clearance is allowed between the deflector and the frame 13 of the vehicle to permit of the glass deflector being turned in the various desired positions without failing to clear the spot-light 13ª which is usually positioned on the frame 13.

A mirror 43 may be secured to the upper rod 17 by means of a rod 44 having at the end thereof a sleeve 45 whereby the mirror may be rotated about the rod 17. The mirror may further be rotated relative to the rod 44 by securing the same to the latter in a suitable manner. Thus the rod 44 may be provided with a forked end 45 fitting in between ring members 46 extending from the mirror. A screw or pin 47 then passes through members 45 and 46, thus permitting the mirror to rotate about said screw.

The operation of the device will now be clear. With the construction hereinabove described, it will be evident that the wind deflector 14 may be turned into various positions as desired by reason of the swivel construction already described whereby the supporting frame of the deflector is secured to the frame 13 or other portion of the vehicle. The clamping of the deflector 14 in position is accomplished in the most efficient and simple manner by first turning the clamp members 16, 16' into the required position depending upon the shape of the glass deflector and then pulling on the ball heads 19, 19' so as to draw the rods 17, 17' out of the tubes 24 against the springs 25, 25'. The clamps may then be allowed to snap against the edges of the deflector under the restoring action of the springs, as will be readily understood. To prevent marring or breaking of the glass, the edges of the clamp may be lined with some felt or rubber material such as shown at 48, 48'. The mirror 43 is also positioned in a convenient place near the upper portion of the deflector and may be turned at various angles as may be desired, as described. The means for the securing thereof to the vehicle of the clamping device are all united in one compact and neat appearing construction which may be readily applied to a vehicle without marring the neatness of appearance thereof.

Apart from the function of the rod 17, 17', the tube 24 and the springs 25, 25' in snapping the clamps 16, 16' in position against the glass deflector, this rod, tube and spring arrangement also function as a shock absorber, the rod 17, 17' having play within the tube 24 and under the resilient action of the spring 25, 25', to take up any shock to which the vehicle may be subjected during its operation, and thus prevent injury to the glass deflector.

The rods 17, 17' are rotatable within the tube 24, and in this way the glass deflector may be rotated about these rods as axis; also the arms 27, 27' may rotate together with the tube 24 about the rods 17, 17' thus permitting further adjustments as to the position of the whole device relative to the frame 13. The bolt 32 passes through the openings 42ª in the clamps 32, 32' and the latter may rotate about said bolt so that the whole device including the glass deflector, the tube 24 and the arms 27, 27' may be rotated relative to the frame 13. It will thus be seen that the construction as hereinbefore described permits of various adjustments as to position, the glass deflector being adjustable as to position relative to the tube 24, both the glass deflector and said rods being in adjustable position relative to said tube, and the whole device including glass deflector, tube and attaching arms, adjustable in its position relative to the frame 13.

It will thus be seen that there is provided apparatus in which the several objects of this invention are achieved and which is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent;—

1. In a device of the character described, a wind deflector, and a frame for supporting the deflector, said frame including clamps extending therefrom and means for snapping said clamps in position against the edges of said deflector, said means comprising a rod connected to each of said clamps, a tubular member within which said rods are adapted to reciprocate, and a spring housed within said tubular member, the tension of which is adapted to restore the rod into the tubular member after being drawn out of the latter.

2. A wind shield deflector comprising a deflector body, a pair of clamp members to be mounted upon a vehicle, a second set of clamp members engaging with opposite edges of the deflector body, rods associated with the second set of clamp members extending in alined relation, a sleeve encasing the ends of said rods, resilient means within the sleeve engaging said rods to draw the second set of clamps into engagement with the deflector body, said first set of clamp members being adapted to engage with the sleeve and adjustably support the same.

3. In a device of the class described, a wind deflector, and a frame for supporting said deflector, said frame including clamp members extending therefrom and including means for causing the engagement of said clamp members with the edges of said deflector, said means comprising guide rods connected to said clamps, a guide for said guide rods, and springs engaging said guide rods.

4. In a device of the class described, a wind deflector and a frame, said frame having clamp members for engaging said wind deflector, supports for said clamp members, and resilient means for engaging said supports to cause the said engagement of said clamp members with the deflector.

5. A wind shield deflector including in combination, a wind shield frame and a deflector body, said frame including means for resiliently connecting the deflector body thereto comprising a pair of clamps, a cushion chamber, springs within said cushion chambers, and plungers carried by said pair of clamps and engaging said springs.

6. In a device of the class described, a wind deflector, and a frame for supporting said deflector, said frame including clamps extending therefrom and means for causing the engagement of said clamps with the edges of said deflector, said means comprising a cushion chamber, springs within said chamber, and plungers normally under the tension of said springs and engaging said clamps.

7. In a device of the class described, a wind shield deflector, and a frame having a cushioned support for said deflector, said support including springs, clamping jaws for engaging with said deflector, and rods carried by said clamping jaws co-operating with said springs to retain said jaws in normal engagement with said deflector.

8. A wind deflector for automobiles comprising a deflector body, clamps to loosely engage the opposite edges of the deflector body, a sleeve, rods associated with said clamps and extending into said sleeve at opposite ends, resilient means within the sleeve engaging said rods to draw the clamps resiliently against the edges of the deflector, and means engaging the sleeve to mount and support the deflector structure upon an automobile.

9. A side wind deflector for automobiles comprising a frangible deflector member, clamps to engage the upper and lower edges of said deflector member, a sleeve, rods associated with the clamp members having their free ends headed and slidably received within the sleeve, said sleeve having its ends closed around the rods, springs fitted around the rods between the heads and the closed ends of the sleeve, and means engaging said sleeve to mount the wind deflector upon an automobile.

Signed at New York city, in the county of New York and State of New York, this 13 day of July, 1921.

BERN JASSEN.